United States Patent [19]
Mann et al.

[11] Patent Number: 5,908,105
[45] Date of Patent: Jun. 1, 1999

[54] INTERNAL HOLDDOWN FOR SINGLE ROD STOKER

[75] Inventors: John Mann, Nepean; Robert E. Pollak, Jr., Ottawa; Patrick Audy, Nepean, all of Canada; Alan V. Greenall, Marietta, Ga.; Pierre Marchand, Rock Forest, Canada

[73] Assignee: Kone Wood, Inc., Norcross, Ga.

[21] Appl. No.: 08/711,391

[22] Filed: Sep. 3, 1996

[51] Int. Cl.$^6$ .................................................. B65G 25/00
[52] U.S. Cl. ............................................................ 198/741
[58] Field of Search ............................................. 198/741

[56] References Cited

U.S. PATENT DOCUMENTS

| | | | |
|---|---|---|---|
| 3,802,552 | 4/1974 | Gann et al. | 198/741 |
| 3,828,920 | 8/1974 | Becker et al. | 198/741 |
| 4,026,408 | 5/1977 | Becker | 198/741 |
| 4,594,045 | 6/1986 | Hooper et al. | 198/741 |
| 4,642,015 | 2/1987 | Hooper et al. | 198/741 |

OTHER PUBLICATIONS

Blueprint—Hooper SR Series II Discharger Module/Hydraulic Ass'y Model SR–830 Integral Power Unit; Jan. 21, 1988.

*Primary Examiner*—Joseph E. Valenza
*Attorney, Agent, or Firm*—Alix, Yale, & Ristas, LLP

[57] ABSTRACT

A stoker rod assembly employs a stoker rod having a longitudinally extending bore. A holddown device has a base which is mounted in the trough of the discharger floor, an engagement assembly which is inserted through a slot in the bottom wall of the stoker rod and a connecting part extending between the base and the engagement assembly. The slot comprises a first region having a width selected to allow the passage of the engagement assembly into or out of the bore. A second longitudinally extending region has a width selected to allow longitudinal movement of the connecting part. The width of the engagement assembly is greater than the width of the second region, wherein the engagement assembly is retained in the bore when the engagement assembly is positioned above the second region. Bearing wheels or bearing pads in the engagement assembly slidably engage the internal surface of the stoker rod to hold down the stoker rod as the rod oscillates longitudinally in the trough.

20 Claims, 6 Drawing Sheets

5,908,105

INTERNAL HOLDDOWN FOR SINGLE ROD STOKER

BACKGROUND OF THE INVENTION

This invention relates generally to dischargers for discharging bulk fibrous or loose material from a storage bin to a discharge screw or conveyor in a controlled manner. More particularly, the present invention relates to a Hooper SR Discharger™.

Several types of dischargers include one or more stoker rods to move the material in a controlled manner. The Hooper SR Discharger™ utilizes stoker rods defining a hollow square steel tube which run on bearing pads in troughs in the discharger floor. A plurality of pusher bars are mounted at right angles along the top surface of the stoker rods in spaced relationship. Oscillating movement of the stoker rods provides a discharge stroke and a return stroke. On the discharge stroke, the pusher bar moves the material towards the discharge. On the return stroke, the pusher bar moves back under the material in preparation for the next discharge stroke.

The Hooper SR Discharger does not have a means for preventing fines which are present in the material from falling into the gap between the stoker rod and the floor trough. Eventually the trough fills with fines and the stoker rod is lifted upward by the accumulating fines. Such upward movement results in improper operation of the discharger and may cause severe damage to the oscillating mechanism.

Various holddown devices have been used to prevent the stoker rod from lifting. Typically, these holddown devices have consisted of a pair of bars which are disposed across the top of the stoker rod. Such bars are mounted to the flat floor of the discharger on either side of the floor trough at both ends of the stoker rod. Away from the stiff trough area, the floor is not well supported against upward loads. Consequently, the upward force exerted on the bars by the fines, via the stoker rod, can cause floor damage. Additionally, such bars interfere with the movement of material towards the discharge, reducing the efficiency of the stoker. They also interfere with cleaning, maintenance and repair operations for the floor.

SUMMARY OF THE INVENTION

The invention is a stoker rod assembly for a discharger having a floor including a trough. The stoker rod assembly comprises a stoker rod which is positioned longitudinally in the trough and a means for reciprocating the rod longitudinally in the trough. The stoker rod has a longitudinally extending internal channel. A holddown device is fixed to the trough and engages the channel, thereby limiting vertical movement of the rod as the rod is reciprocated.

In a preferred form, the invention is a stoker rod assembly which is used in a Hooper SR Discharger. Such dischargers employ a stoker rod having a longitudinally extending bore. At least one holddown device holds the stoker rod against the pressure exerted by accumulating fines. Each holddown device has a base which is mounted in the rigid trough of the discharger floor and an engagement assembly which is inserted through a slot in the bottom wall of the stoker rod. Bearing wheels or bearing pads in the engagement assembly slidably engage the internal surface of the stoker rod to hold the stoker rod.

Each slot comprises a first region having a width selected to allow the passage of the engagement assembly into or out of the bore. A second longitudinally extending region has a width selected to allow longitudinal movement of the portion of the holddown device that connects the base to the engagement assembly. The width of the engagement assembly is greater than the width of the second region, wherein the engagement assembly is retained in the bore when the engagement assembly is positioned above the second region.

An object of the invention is to provide a new and improved stoker rod assembly that resists lifting of the stoker rod due to accumulating fines.

Another object of the invention is to provide a new and improved stoker rod assembly that holds the stoker rod in place but does not interfere with cleaning, maintenance and repair operations for the floor.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
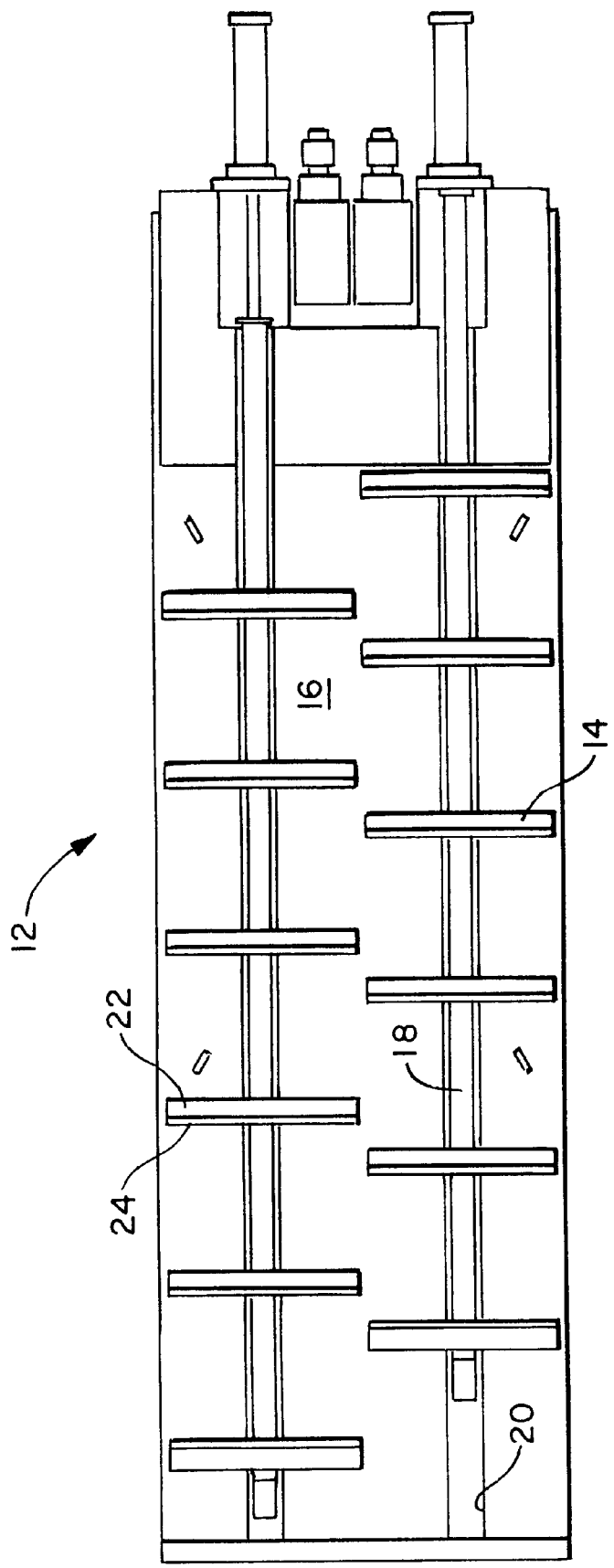
FIG. 1 is a top plan view of a discharger having a stoker rod assembly in accordance with the invention.
Figure 2:
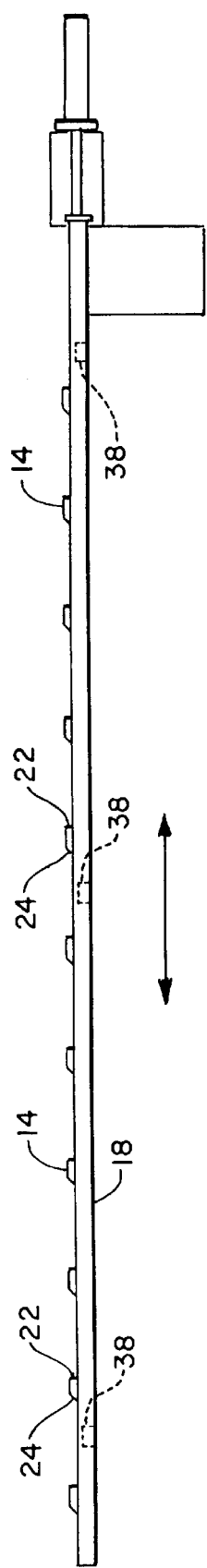
FIG. 2 is an enlarged side view, partly in phantom, of the stoker rod of FIG. 1.
Figure 3:
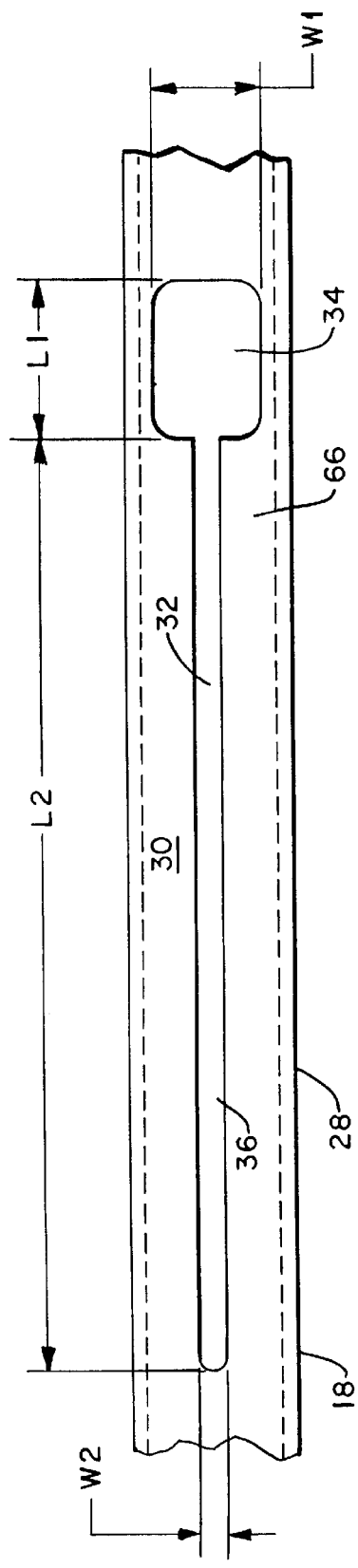
FIG. 3 is an enlarged bottom view of a portion of the stoker rod of FIG. 2.
Figure 4:
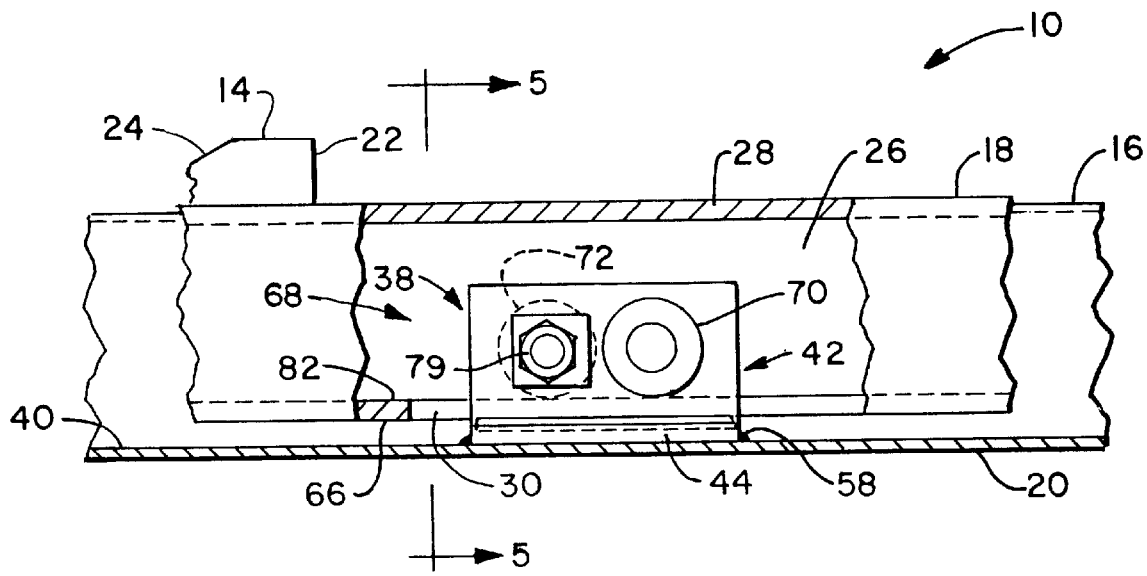
FIG. 4 is an enlarged side elevation view, partly in cross section and partly in phantom, of the floor and a first embodiment of the stoker rod assembly of FIG. 1.

With reference to the drawings wherein like numerals represent like parts throughout the several figures, a stoker rod assembly in accordance with the present invention is generally designated by the numeral 10. The stoker rod assembly 10 is used in a Hooper SR Discharger 12.

The Hooper SR Discharger™ 12 utilizes a plurality of pusher bars 14 to push fibrous or loose material which is supported by the floor 16 of the discharger 12 towards a discharge. The pusher bars 14 are mounted at right angles to the top of a stoker rod 18 in spaced relationship such that the pusher bars 14 extend over the floor 16. The stoker rod 18 is disposed in a trough 20 in the floor 16 to minimize the clearance between the pusher bars 14 and the floor 16. The pusher bars 14 have one flat face 22 and one sloping face 24. Oscillating movement of the stoker rods 18, at adjustable speeds, provides a discharge stroke and a return stroke. On the discharge stroke, the pusher bars 14 sweep the floor 16 with the flat face 22 of each pusher bar 14 moving the material towards the discharge. On the return stroke, the sloping face 24 of each pusher bar 14 slides through the material to position the pusher bars 14 for the next discharge stroke.

Figure 5:
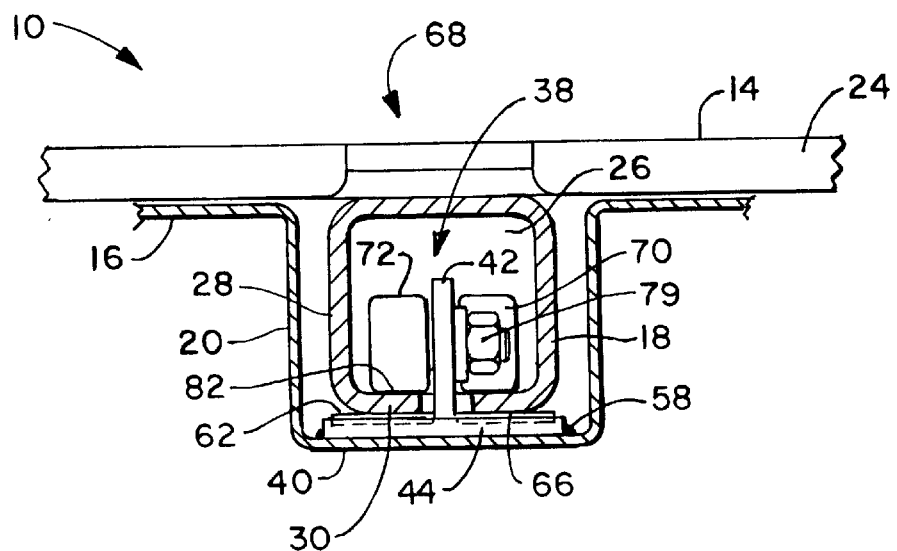
FIG. 5 is a cross section view, partly in phantom, of the floor and stoker rod assembly taken along line 5—5 of FIG. 4.
Figure 9:
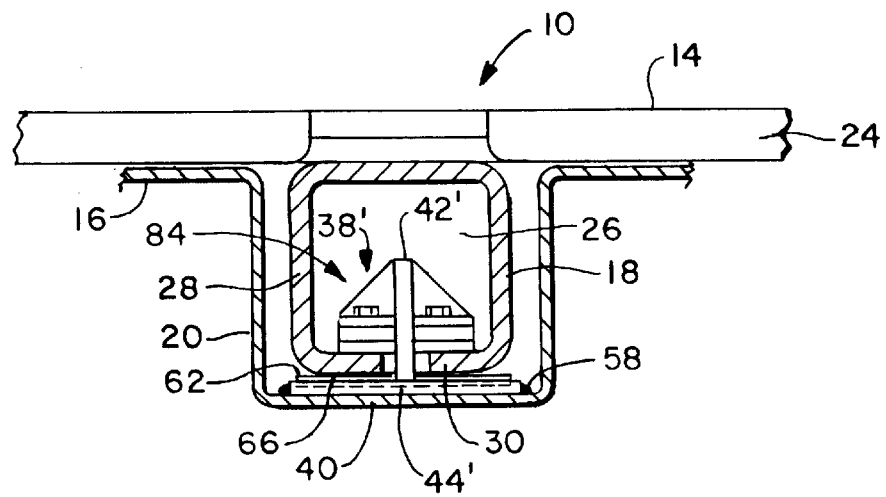
FIG. 9 is a cross section view, partly in phantom, of the floor and stoker rod assembly taken along line 9—9 of FIG. 8.

The stoker rods 18 define a hollow rectangular, preferably square, steel tube, (FIGS. 5 and 9) comprising a longitudinal bore 26 and four longitudinally extending wall sections 28. In a preferred embodiment, the bottom wall section 30 includes three longitudinally extending slots 32. Alternatively, the number of slots 32 may be increased or decreased so long as at least one slot 32 is provided. Each slot 32 comprises first and second regions 34, 36, wherein the width W1 of the first region 34 is greater than the width W2 of the second region 36 as explained below. Preferably, the length L2 of the second region 36 is longer than the length L1 of the first region 34.

Holddown devices 38, 38', mounted to the floor 40 of the trough 20, are used to hold the stoker rod 18 in the trough 20 against the pressure exerted by accumulating fines. There is one holddown device 38, 38' for each slot 32. As shown in FIGS. 6, 7, 10 and 11, each holddown device 38, 38' includes a unitary member 42, 42' comprising a base portion 44, 44' having upper and lower surfaces 46, 46', 48, 48' and an extension portion 50, 50' which extends outwardly from the upper surface 46, 46' to define first and second base legs 52, 52'. The extension portion 50, 50' comprises an upper mounting part 54, 54' and a lower connecting part 56, 56'. The base portion 44, 44' is mounted to the floor 40 of the trough 20, preferably by at least one weld 58, such that the lower surface 48, 48' engages the floor 40 of the trough 20. The upper surface 46, 46' of each base leg 52, 52' defines a recess 60, 60'. A bearing pad 62 is mounted in each recess 60, 60' such that a portion of each bearing pad 62 extends above the upper surface 46, 46' to form a glide for the stoker rod 18. Preferably, the bearing pads 62 are composed of a low friction material such as UHMW plastic. However, other materials which minimize the friction between the upper surface 64 of the bearing pad 62 and the exterior surface 66 of the bottom wall section 30 may be used.

In the embodiment 68 shown in FIGS. 4–7, the extension portion 50 is a plate-shaped member which is substantially orthogonal to the base portion 44. A pair of wheels 70, 72 are mounted to the mounting part 54 of the extension portion 50 wherein the first wheel 70 is mounted to one side 74 and the second wheel 72 is mounted to the other side 76 to form an engagement assembly 77. The axles 78 which mount the wheels 70, 72 to the mounting part 54 are longitudinally spaced from each other sufficient to allow the nuts 79 to be tightened onto the axles 78. The height 80 of the axles 78 is selected such that the wheels 70, 72 and bearing pads 62 engage the interior and exterior surfaces 82, 66 of the bottom wall section 30 while allowing movement therebetween.

In the embodiment 84 shown in FIGS. 8–11, the mounting part 54' comprises a brace 86 and two arms 88. The connecting part 56' and the brace 86 define a plane which is substantially orthogonal to the plane defined by the base portion 44' and the plane defined by the arms 88. At least one buttress 90 connects each side of the brace 86 to the upper surface 92 of the respective arm 88. Bearing pads 94 are mounted to the lower surface 96 of each arm 88 to form an engagement assembly 98. Preferably, the bearing pads 94 are composed of a low friction material such as UHMW plastic. However, other materials which minimize the friction between the lower surface 100 of the bearing pad 94 and the interior surface 82 of the bottom wall section 30 may be used. In a preferred embodiment, each bearing pad 94 is mounted to the arm 88 by a pair of screws 102. Alternatively, the bearing pads 94 may be mounted to the arms 88 by other suitable means. The height 104 of the lower surface 96 of the arms 88 is selected such that the bearing pads 94, 62 engage the interior and exterior surfaces 82, 66 of the bottom wall section 30 while allowing movement therebetween.

Figure 6:
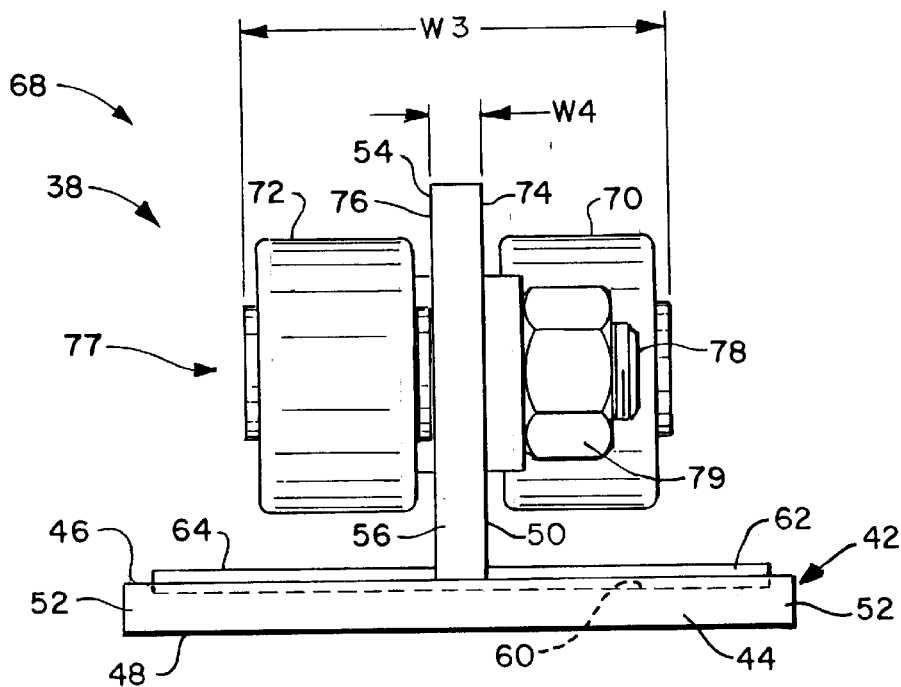
FIG. 6 is an enlarged front view, partly in phantom, of the holddown device of FIG. 4.
Figure 7:
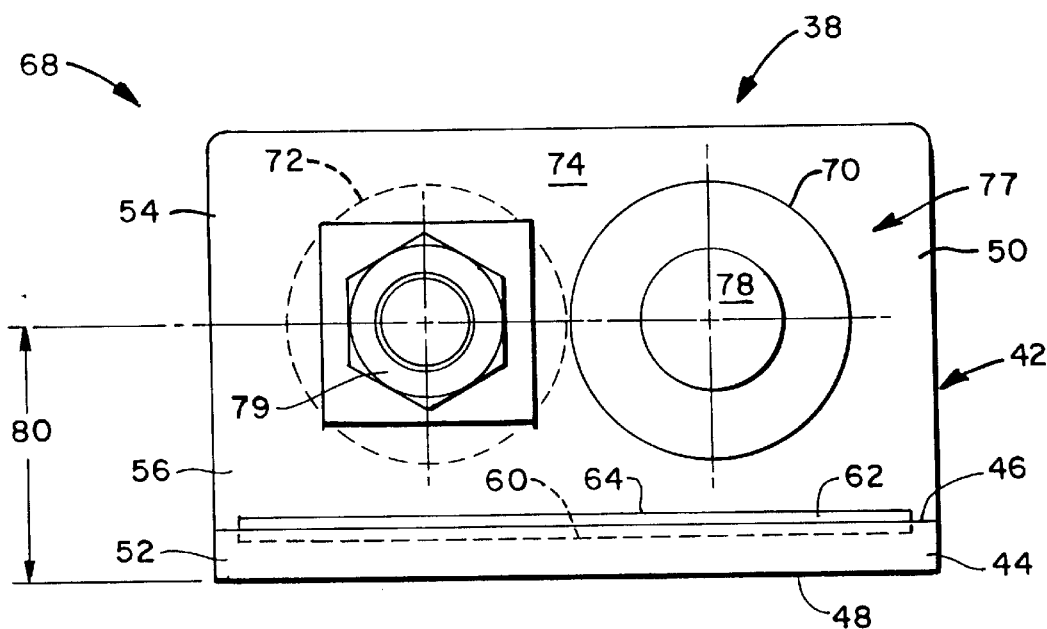
FIG. 7 is a side view, partly in phantom, of the holddown device of FIG. 6.
Figure 8:
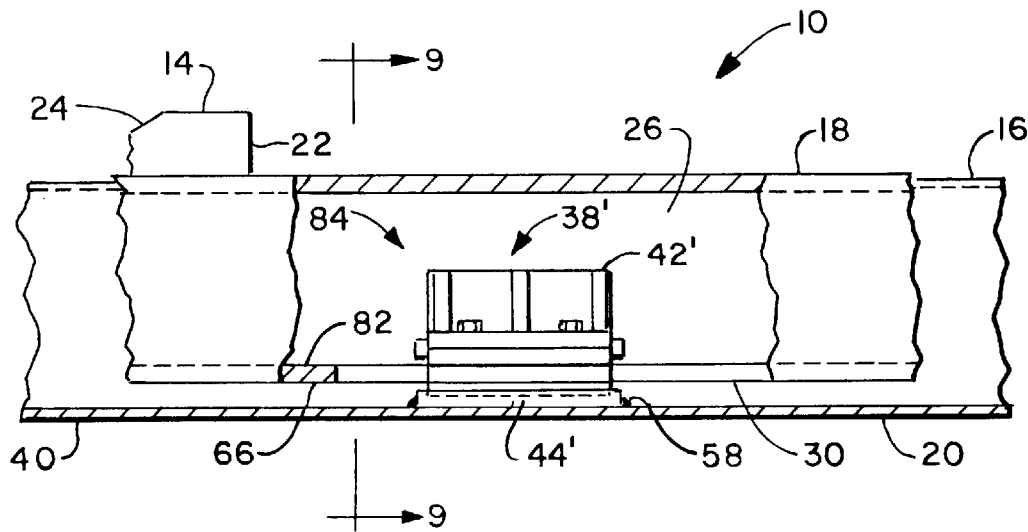
FIG. 8 is an enlarged side elevation view, partly in cross section and partly in phantom, of the floor and a second embodiment of the stoker rod assembly of FIG. 1.
Figure 10:
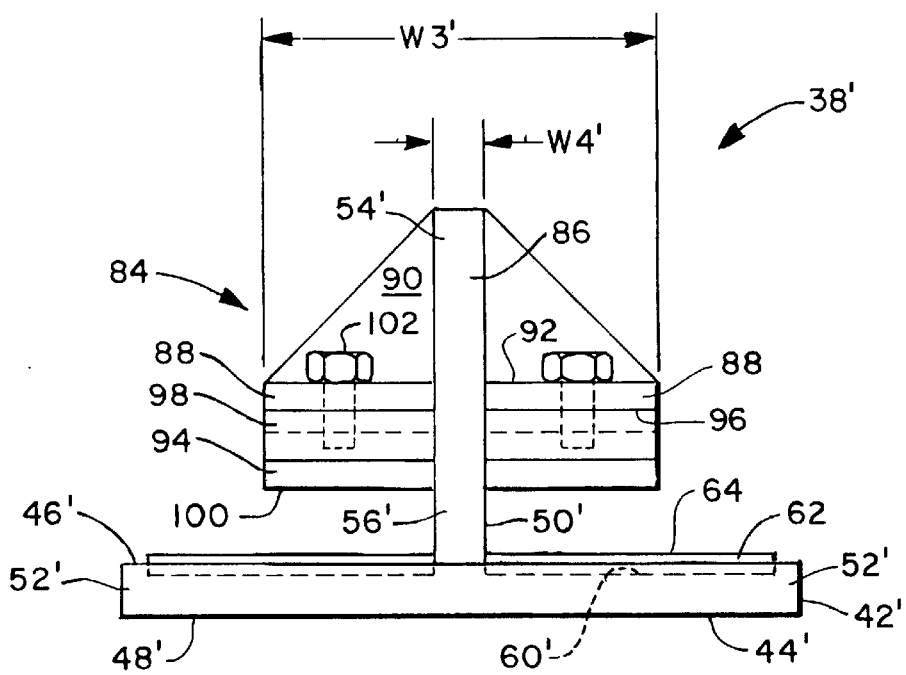
FIG. 10 is an enlarged front view, partly in phantom, of the holddown device of FIG. 8.
Figure 11:
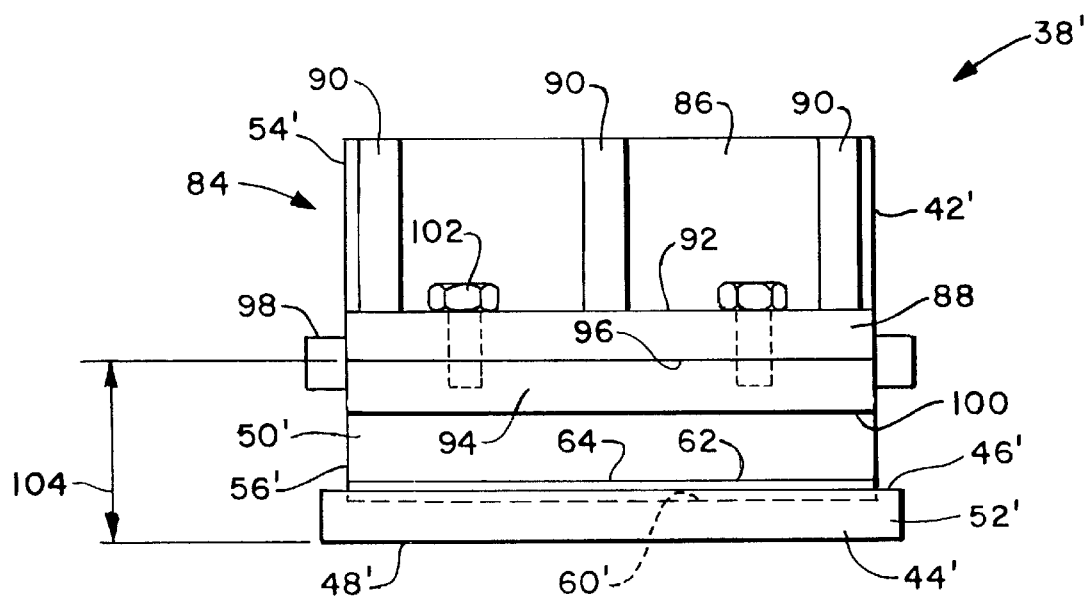
FIG. 11 is a side view, partly in phantom, of the holddown device of FIG. 10.

As shown in FIGS. 6 and 10, the width W3, W3' of the engagement assemblies 77, 98 are greater than the width, W4, W4' of the connecting part 56, 56'. The width W1 of the first region 34 is selected such that the engagement assembly 77, 98 may be inserted through the first region 34 of the slot 32 into the bore 26. The width W2 of the second region 36 is selected such that the connecting part 56, 56' may slide longitudinally in the second region 36 of the slot 32 wherein bearing pad 62 slidably engages the exterior surface 66 of the bottom wall section 30 and either the wheels 70, 72 or bearing pad 94 slidably engage the interior surface 82 of the bottom wall section 30. Since the width W2 of the second region 36 of the slot 32 is smaller than the width W3, W3' of the engagement assembly 77, 98, the engagement assembly 77, 98 is retained in the bore 26.

It should be appreciated that the stoker rods 18 are mounted to the floor 16 by positioning the first region 34 of each slot 32 above an engagement assembly 77, 98. The stoker rod 18 is lowered such that the engagement assemblies 77, 98 are inserted into the bore 26. Sliding the stoker rod 18 longitudinally causes the engagement assemblies 77, 98 to engage the stoker rod 18. The stoker rod 18 may be removed by sliding the stoker rod 18 longitudinally such that each engagement assembly 77, 98 is positioned above the first region 34 of a slot 32 and then lifting the stoker rod 18 out of the trough 20. The holddown devices 38, 38' are positioned in the trough 20 such that the oscillatory movement of the stoker rod 18 does not position the engagement assembly 77, 98 above the first region 34 of the slot 32.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A stoker rod assembly for a discharger having a floor defining a trough, the stoker rod assembly comprising:

at least one stoker rod locatable longitudinally within the trough and comprising an internal surface defining a longitudinal bore, an external surface, and slot means defining at least one longitudinally extending slot traversing said surfaces, said slot comprising a first region having a width W1 and a second region having a width W2, wherein said W1>W2; and holddown means for holding said stoker rod in the trough, said holddown means comprising engagement means disposed within said bore for engaging said internal surface, mounting means fixedly mountable to the trough, and connection means for connecting said holddown means to said engagement means, said connection means extending through said slot.

2. The stoker rod assembly of claim 1 wherein said stoker rod has a substantially rectangular cross section, defined by four wall sections and one of said wall sections has a cut out which defines said slot means.

3. The stoker rod assembly of claim 1 wherein said first region has a longitudinal length L1 and said second region has a longitudinal length L2, wherein L1<L2.

4. The stoker rod assembly of claim 3 wherein said engagement means has a width W3 and said connection means has a width W4, wherein W3>W4.

5. The stoker rod assembly of claim 4 wherein W1>W3, W3>W2, and W2>W4.

6. The stoker rod assembly of claim 1 wherein said engagement means comprises wheel means for rolling along said interior surface.

7. The stoker rod assembly of claim 6 wherein said engagement means further comprises a longitudinally extending member having oppositely facing first and second sides and said wheel means comprises first and second wheels, said first wheel being rotatably mounted to project from said first side and said second wheel being rotatably mounted to project from said second side.

8. The stoker rod assembly of claim 6 wherein said engagement means further comprises a longitudinally extending member and said wheel means comprises first and second wheels, said first and second wheels being rotatably mounted to said member in longitudinally spaced relationship.

9. The stoker rod assembly of claim 1 wherein said engagement means comprises bearing means for slidably engaging said interior surface.

10. The stoker rod assembly of claim 9 wherein said engagement means includes a member having longitudinally extending first and second arms defining a first plane and said bearing means comprises first and second longitudinally extending bearing pads mounted to said first and second arms, respectively.

11. The stoker rod assembly of claim 10 wherein said member further comprises a longitudinally extending brace disposed intermediate said first and second arms, said brace defining a second plane which is substantially orthogonal to said first plane, said member further comprising a plurality of buttresses extending from said brace to said first and second arms.

12. The stoker rod assembly of claim 1 wherein said engagement means comprises oppositely disposed first and second surfaces, said first surface being engageable with the trough and said second surface comprising recess means for defining at least one recess, and bearing means partially disposed in said recess means for slidably engaging said external surface.

13. A discharger for discharging fibrous or loose material from a bin in a controlled manner, said discharger comprising:

floor means for supporting the material in the bin, said floor means comprising an upper, material support floor and a trough defining a lower, engagement floor;

at least one stoker rod defining an axis and a longitudinal bore and comprising an internal surface, an external surface, and slot means defining at least one longitudinally extending slot traversing said surfaces, said slot comprising first and second regions, said first region having a width W1, said second region having a width W2, wherein said W1>W2, said stoker rod being at least partially located within the trough;

at least one pusher bar mounted to said stoker rod wherein said pusher bar is located above said material support floor, said pusher bar defining an axis wherein said axis of said pusher bar is substantially orthogonal to said axis of said stoker bar; and holddown means for holding said stoker rod in the trough, said holddown means comprising engagement means disposed within said bore for engaging said internal surface, mounting means mounted to the engagement floor, and connection means extending through said slot for connecting said holddown means to said engagement means.

14. The stoker rod assembly of claim 13 wherein said slot means comprises a plurality of slots.

15. The stoker rod assembly of claim 14 wherein said engagement means has a width W3 and said connection means has a width W4, wherein W1>W3, W3>W2, and W2>W4.

16. The stoker rod assembly of claim 13 wherein said engagement means comprises wheel means for rotatably engaging said interior surface.

17. The stoker rod assembly of claim 16 wherein said engagement means further comprises a longitudinally extending member having oppositely facing first and second sides and said wheel means comprises first and second wheels, said first wheel being rotatably mounted to project from said first side and said second wheel being rotatably mounted to project from said second side, said first and second wheels being rotatably mounted to said member in longitudinally spaced relationship.

18. The stoker rod assembly of claim 13 wherein said engagement means comprises bearing means for slidably engaging said interior surface.

19. The stoker rod assembly of claim 18 wherein said engagement means further comprises a member having longitudinally extending first and second arms defining a first plane, a longitudinally extending brace disposed intermediate said first and second arms and defining a second plane which is substantially orthogonal to said first plane, and a plurality of buttresses extending from said brace to said first and second arms, said bearing means comprising first and second longitudinally extending bearing pads mounted to said first and second arms, respectively.

20. A stoker rod assembly for a discharger having a floor defining a trough, the stoker rod assembly comprising:

a stoker rod located longitudinally in the trough and having a longitudinally extending channel;

means for reciprocating the rod longitudinally in the trough; and holddown means fixed to the trough and engaging the channel, for limiting vertical movement of the rod as the rod is reciprocated, said holddown means comprising wheel means for rotatably engaging said channel.

* * * * *